(12) United States Patent
Reddington

(10) Patent No.: US 9,503,473 B1
(45) Date of Patent: *Nov. 22, 2016

(54) APPARATUS, SYSTEM, AND METHOD FOR PROTECTING AGAINST KEYLOGGING MALWARE

(71) Applicant: Trusted Knight Corporation, Annapolis, MD (US)

(72) Inventor: Raymond Lloyd Reddington, Delta (CA)

(73) Assignee: Trusted Knight Corporation, Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/207,279

(22) Filed: Jul. 11, 2016

Related U.S. Application Data

(63) Continuation of application No. 14/709,224, filed on May 11, 2015, which is a continuation-in-part of application No. 13/667,256, filed on Nov. 2, 2012, now abandoned, which is a continuation of application No. 12/427,833, filed on Apr. 22, 2009, now Pat. No. 8,316,445.

(60) Provisional application No. 61/125,178, filed on Apr. 23, 2008.

(51) Int. Cl.
*H04L 29/06* (2006.01)

(52) U.S. Cl.
CPC ..... *H04L 63/1475* (2013.01); *G06F 2221/031* (2013.01); *G06F 2221/2143* (2013.01)

(58) Field of Classification Search
CPC .............. H04L 63/1475; G06F 2221/031; G06F 2221/2143
See application file for complete search history.

(56) References Cited

U.S. PATENT DOCUMENTS

| 4,177,510 | A | | 12/1979 | Appell et al. |
| 5,974,549 | A | * | 10/1999 | Golan ............... G06F 9/468 714/47.3 |
| 6,314,492 | B1 | * | 11/2001 | Allen ............... G06F 17/30902 707/E17.12 |
| 6,996,718 | B1 | * | 2/2006 | Henry ............... G06F 21/41 713/182 |

(Continued)

FOREIGN PATENT DOCUMENTS

| JP | 2007-116641 | 5/2007 |
| WO | WO 2008/127668 | 10/2008 |

OTHER PUBLICATIONS

Heng Yin, Zhenkai Liang, and Dawn Song. "HookFinder: Identifying and Understanding Malware Hooking Behaviors", Appeared in Proceeding of the 15th Annual Network and Distributed System Security Symposium (NDSS'08), Feb. 2008.*

(Continued)

*Primary Examiner* — Darren B Schwartz
(74) *Attorney, Agent, or Firm* — Beyer Law Group LLP

(57) ABSTRACT

An apparatus, system, and method is disclosed for protecting against key logger malware. The protection includes protection form grabbing keylogger malware. In response to detecting a form submission event from a browser associated with a user entering data into a form, confidential data is cleared to prevent it being captured by malware. Additional protection of data inputs, entered at a driver level, may be provided as an additional level of protection against hook based malware operating at a virtual keyboard level or operating system level. Data inputs received at a physical driver level may be protected as they pass through a virtual keyboard level and an operating system level. The projection against malware may be provided as a preventive measure that does not require detection of the key logger malware itself.

29 Claims, 8 Drawing Sheets

(56) References Cited

U.S. PATENT DOCUMENTS

| | | | |
|---|---|---|---|
| 7,774,595 B2 | 8/2010 | Geon et al. | |
| 7,779,062 B2 | 8/2010 | Waterson | |
| 7,975,308 B1 | 7/2011 | Satish et al. | |
| 8,020,215 B2 | 9/2011 | Nam | |
| 8,316,445 B2 | 11/2012 | Liske | |
| 2002/0066039 A1* | 5/2002 | Dent | G06F 21/31 726/5 |
| 2002/0091745 A1* | 7/2002 | Ramamurthy | G06F 17/30867 718/100 |
| 2002/0129277 A1* | 9/2002 | Caccavale | G06F 21/562 726/24 |
| 2003/0132958 A1* | 7/2003 | Himmel | G06F 21/62 715/745 |
| 2004/0010682 A1* | 1/2004 | Foster | H04L 63/0823 713/156 |
| 2004/0034794 A1* | 2/2004 | Mayer | G06F 21/567 726/23 |
| 2004/0080529 A1* | 4/2004 | Wojcik | G06F 21/83 715/738 |
| 2004/0098607 A1* | 5/2004 | Alagna | G06Q 20/40 726/24 |
| 2004/0215971 A1* | 10/2004 | Nam | G06F 21/83 726/22 |
| 2004/0268152 A1* | 12/2004 | Xia | H04L 63/0281 726/5 |
| 2005/0071282 A1* | 3/2005 | Lu | G06F 21/42 705/64 |
| 2005/0138433 A1* | 6/2005 | Linetsky | G06F 21/31 726/19 |
| 2005/0198532 A1* | 9/2005 | Comlekoglu | H04L 63/0272 726/5 |
| 2006/0036731 A1* | 2/2006 | Mossman | H04L 63/10 709/225 |
| 2006/0070126 A1 | 3/2006 | Grynberg | |
| 2006/0101128 A1* | 5/2006 | Waterson | G06F 21/52 709/212 |
| 2006/0206937 A1* | 9/2006 | Repasi | G06F 21/52 726/22 |
| 2006/0206943 A1 | 9/2006 | Ellison et al. | |
| 2006/0253582 A1 | 11/2006 | Dixon et al. | |
| 2006/0282678 A1* | 12/2006 | Ali | G06F 21/34 713/185 |
| 2007/0143593 A1* | 6/2007 | Cardoso | G06F 21/83 713/150 |
| 2007/0182714 A1* | 8/2007 | Pemmaraju | G06F 21/83 345/168 |
| 2007/0198825 A1* | 8/2007 | Schwarz | H04L 63/166 713/151 |
| 2007/0234061 A1* | 10/2007 | Teo | G06F 21/566 713/178 |
| 2007/0245343 A1 | 10/2007 | Shannon et al. | |
| 2007/0250927 A1 | 10/2007 | Naik et al. | |
| 2008/0016339 A1* | 1/2008 | Shukla | G06F 21/53 713/164 |
| 2008/0028441 A1* | 1/2008 | Novoa | G06F 21/83 726/4 |
| 2008/0189790 A1* | 8/2008 | Park | G06F 21/56 726/26 |
| 2008/0263672 A1 | 10/2008 | Chen et al. | |
| 2008/0274716 A1 | 11/2008 | Fok et al. | |
| 2008/0301051 A1* | 12/2008 | Stahlberg | G06Q 20/40 705/44 |
| 2008/0320588 A1* | 12/2008 | Lipetz | G06F 21/6218 726/19 |
| 2009/0007243 A1 | 1/2009 | Boodaei et al. | |
| 2009/0077383 A1* | 3/2009 | de Monseignat | H04L 63/0823 713/175 |
| 2009/0260077 A1* | 10/2009 | Zhu | G06F 21/34 726/19 |
| 2010/0024036 A1* | 1/2010 | Morozov | G06F 21/53 726/26 |
| 2010/0031325 A1* | 2/2010 | Maigne | G06F 9/45533 726/4 |
| 2013/0061323 A1 | 3/2013 | Liske | |
| 2015/0332047 A1* | 11/2015 | Rothwell | G06F 21/566 726/23 |

OTHER PUBLICATIONS

"Trlokom Central Management". Trlokom Inc, 2002-2004.*
Risherz, "Clearing Your Private Data After Every Browser Session". www.tech-recipes.com/rx/1074/clear-your-private-data-after-every-browser-session/, Nov. 13, 2015.*
Jackson, Don. "Gozi Trojan Threat Analysis". www.secureworks.com/research/gozi, Mar. 20, 2007.*
"Anti-Keylogger Elite v.3.3.3", www.remove-keyloggers.com/index.php as archived by the Internet Archive Wayback Machine web.archive.org on Apr. 27, 2007.*
International Search Report dated Jun. 17, 2010 from International Application No. PCT/US10/01199.
Jill Beissel, "Who Invented the USB Flash Drive Part 1", http://blog.premiumusb.com/2011/08/who-invented-the-usb-flash-drive-part-1/, Aug. 12, 2011.
Brian Krebs, "ING Introduces Tool for Safe E-Banking on Infected PCs", http://voices.washingtonpost.com/securityfix/2008/05/ing_tool_provides_safe_ebankin_1.html, May 23, 2008.
The Difference Between ActiveX and Plug-In, Sep. 29, 2010.
NPL-2012-IOActiveZeusSpyEyeBankingTrojanAnalysis, IOActive, 2012.
Wikipedia, "Protection Ring", https://en.wikipedia.org/wiki/Protection_ring, Jun. 24, 2014.
Matsumoto et al., "A Keylogger Detection Using Dynamic API Inspection", Intrusion Detection, Special Issue, Reconsidering Computer Security Technology for Information Systems, vol. 48, No. 9, Sep. 2007.
Salam et al., "Anti-Hook Shield Against the Software Key Loggers", Al-Khawarizmi Institute of Computer Science, University of Engineering and Technology, National Conference on Emerging Technologies, 2004.
Lynn Erla Beegle, "Rootkits and Their Effects on Information Security", Information Systems Security, May/Jun. 2007, pp. 164-176.
Li et al., "SpyShield: Preserving Privacy from Spy Add-ons", School of Informatics, Indiana University at Bloomington, Sep. 5, 2007.
Ross et al., Stronger Password Authentication Using Browser Extensions, Security '05 Technical Program, Jul. 31, 2005.
Idika et al., "A Survey of Malware Detection Techniques", Department of Computer Science, Purdue University, Feb. 2, 2007.
Florencio et al, "Stopping a Phishing Attack, Even When the Victims Ignore Warnings", Microsoft Research, CiteSeer, 2005.
Invalidity Contentions including Exhibits 1-7, May 13, 2015.
Plaintiff Trusted Knight's Opening Claim Construction Brief, Jul. 31, 2015.
Defendant's Opening Claim Construction Brief, Jul. 31, 2015.
Declaration of Dr. Seth Nielson including Exhibit A, Jul. 31, 2015.
Defendant's Responsive Claim Construction Brief, Aug. 28, 2015.
Plaintiff Trusted Knight's Answering Claim Construction Brief, Aug. 28, 2015.
Declaration of Scott M. Nettles Ph.D. in Support of Plaintiff Trusted Knight's Answering Claim Construction Brief, Aug. 28, 2015.
Defendant's First Amended Initial Invalidity Contentions, Nov. 6, 2015.
Claim Construction Opinion, Nov. 19, 2015.
Order on Claim Construction, Nov. 19, 2015.
Opening Brief of Plaintiff-Applicant, Apr. 4, 2016.
Opening Response Brief of Defendant IBM and Trusteer Inc., Jun. 8, 2016.
Reply Brief of Plaintiff-Applicant, Jun. 30, 2016.
Reply Brief of Plaintiff-Applicant, Jul. 5, 2016.

* cited by examiner

500

Login Form

Username: [        ]
Password: [        ]
☐ Remember me on this computer.
[ Sign in ]

510

Personal Identity and Financial Form

*First Name: [        ]
*Last Name:
*Card Type: [     ▽]
*Card Number: [        ]
*Expiration Date: [01 ▽][2008 ▽]
*Card Verification Number: [   ]

*FIG. 5*

APPARATUS, SYSTEM, AND METHOD FOR PROTECTING AGAINST KEYLOGGING MALWARE

This is a Continuation of U.S. application Ser. No. 14/709,224 filed on May 11, 2015, which is a Continuation-in-Part of U.S. application Ser. No. 13/667,256 filed on Nov. 2, 2012, which is a Continuation of U.S. application Ser. No. 12/427,833 filed Jul. 13, 2010, now U.S. Pat. No. 8,316,445, issued on Nov. 20, 2012, which claims the benefit of U.S. Provisional Patent Application Ser. No. 61/125,178 filed on Apr. 23, 2008, the entire contents of each of which are hereby incorporated by reference.

BACKGROUND OF THE INVENTION

Field of the Invention

The present invention relates to systems and methods for protection against the operation of malware commonly used in identity-theft and cyber-fraud. In particular, but not by way of limitation, the present invention relates to systems and methods for preventing key logger malware that utilizes form grabbing techniques to steal financial and identity information from users' browsers.

Description of the Background Art
Identity Theft and Criminal Malware Targeting Browsers Personal computers and business computers are widely infected with malicious software that intercepts and steals critical personal and financial information as it is being called by the user's browser. Almost all online commerce and activity originates from a user electing to open an internet browser to conduct business, either with his or her bank, brokerage, investment manager, or with numerous online stores.

Because of the massive growth in online commerce, and the requirement and use of credit cards and personal data to facilitate that market, sophisticated criminal hackers have targeted this line of commerce with ever-evolving malware. Much of the sophisticated malware is not being caught by commercial anti-virus solutions. Thus, unwitting consumers, believing they are protected, often enter the stream of online commerce not recognizing that malware can, and is, stealing their critical information. This sophisticated theft is taking place due in large part to the rise of what is called key logging malware. Key logging malware is created, often by sophisticated criminal online syndicates, to facilitate the capture of passwords, credit card data, and personal credentials, generally without the person's knowledge.

Key Logging Malware Avoids Detection

Key logging is a method of capturing keyboard input to a computer or computing device. It is a common technique for obtaining passwords and sensitive information using unauthorized software.

Software key loggers capture targeted personal data stored on the computers they infect. The software key loggers are utilized in conjunction with legitimate programs on the infected system. The malware relays the captured data to unauthorized recipients, who have planted the malware on the system by sending that data thru the internet using TCP/IP ports often used by common user applications. Software Key loggers utilize a number of techniques including hooking various operating system Application Programming Interfaces (APIs) and system drivers, screen capture, and form grabbing and hook based keystroke logging.

Hook Based Key Logging Malware

Another technique is hook-based key logging. Hook-based key loggers are programs that insert a system API hook into an API stack by modifying import tables, via insertion of inline hooks, or invoking SetWindowsHookEx( ). This is done by placing a call object into the API stack, acting as a filter. When a user on his or her browser calls a website, the data are filtered thru this malware call. This allows an attacker to record all the data being passed by the system driver to the API stack of a web browser. For example, one type of hook-based key logger will monitor and record each key press that generates an Interrupt Request (IRQ) to the system driver on the motherboard. The key logger, as part of the malware, saves this data as a text file. The text file is subsequently sent to a remote location for retrieval by malefactors.

Malefactors commonly deploy such malware key loggers via the internet to the computers of thousands of unsuspecting users. The volume of data generated by such hook-based key loggers is great, and can amount to many gigabytes of data within a short period. This mass of data is cumbersome to store and difficult to search for the purpose of extracting the very small percentage of data that represents data inputs of interest (e.g., credential and password information). As a result, malefactors have fine-tuned their malware to meet these challenges and better reduce the large take of useless data stolen by their malware.

The Rise of Form-Grabbing Key Loggers

Form-grabbing key loggers insert a hook that captures the form data, and only form data inputs. The form information being stolen is, essentially, those forms used for online banking and other online commerce that require users to enter personal information, card data, passwords, reminder questions, and mother's maiden names. This perfection of the malware allows more precise targeting of stolen credentials, and it greatly increases the odds that credentials stolen will be found and used. Previous methods often resulted in so much data being siphoned out by malware that credentials of interest to financial criminals and identity thieves were buried in the sea of stolen data. This is no longer the case with form-grabbing key loggers.

Form-grabbing key loggers have become a preferred type of key logger for sophisticated cyber criminals due to (1) their resistance to detection and lack of effective countermeasures, (2) their effect of substantially reducing the volume of captured data that must be searched to extract credentials, and (3) almost all credentials used for online transactions are entered at some point into a web form. Form-grabbing key loggers have become the first choice for cyber criminals when targeting bank login data.

Form grabbers sit in between the internet browser and the called internet page. This allows an inserted browser extension to inject or directly access the browser's API functions. This allows all data passed to the form to be recorded as it is passed by the browser. This method of action defeats all known anti-key loggers as they do not protect the web form or the browser window API's. As an example, when a user submits data to a legitimate banking website using web forms, a form-grabbing key logger that is monitoring the web browser can grab the submitted data by injecting a hook and hooking API functions within the browser.

Form grabbers deal with the browser and the data being passed over the internet. Hook-based key loggers record data as it is passed thru the API or system driver.

Form-grabbing key loggers also succeed in recording and stealing automatic form filler data as well as any data copied from another location such as data pasted from a clip board.

Methods to Stop and Detect Key-Loggers

Software is available to detect and remove many types of malware. Attempts to combat all forms of key logger malware have not been successful. Moreover, consumers falsely rely on commercial anti-virus products that are often not updated with the latest version, and even when fully updated or patched, are ineffective to address the root problem of form-grabbing key loggers.

Software is available to address some elements of software key loggers. A number of methods are available to detect and/or disable hook-based key loggers. All known methods deal with accessing the API stack directly. Another approach is represented by the KeyScrambler® product from QFX Software Corporation (Ormand Beach, Fla.) which employs an encryption-based method. According to this method, keystroke data is encrypted at the source (keyboard) and passed to a form in a decrypted format. Another variation of this method is used in the GuardiD® product of StrikeForce Technologies Inc. of Edison, N.J. that utilizes similar API hooking and key-scrambling methods but does not protect the user if the malware is inserting itself as a hook-based key logger at the first instance in the stack. Moreover, this method does not effectively protect users against form grabber threats.

US 2007/0240212 attempts to counter the action of key logger malware by creating a keyboard driver and hooking into various running windows processes. In particular, it creates a keystroke unhook or bypass method. A program engine hooks windows processes and performs a monitoring action in which it looks for hooked calls. When a hooked call is detected, it injects a program and launches new processes. This method creates a false entry state and a false exit state whereby the keystroke data is passed thru these states, i.e., bypassing a keystroke logger hook, by using a separate windows keyboard driver. This method may counter hook-based key loggers but is likely to cause system instability due to the fact it injects into running window processes, a technique which is known to cause memory corruption and system failures. Moreover, a simple modification by the authors of key logger malware would allow such malware to identify the anti-key logger driver file and hook this process instead, thus allowing the key logger to capture the users keystrokes as they pass through that process. This method does not protect against the action of hook-based key loggers that are programmed to insert themselves prior to the anti-key logger ("AKL") itself hooking within the API stack, thus making it ineffective against the current generation of form grabbing key logger malware.

It is an object of an embodiment of the present invention to provide a solution to protect against key loggers that is not disruptive of the system and does not depend on user experience by, for example, asking the user to determine whether flagged processes or programs should be allowed to operate. The solution of the present invention does not depend on detection of malware at all. An embodiment of the present invention, instead, defeats the action of form-grabbing key loggers. An embodiment of the present invention can likewise defeat the action of hook-based key loggers that are capable of operating in the presence of scramblers.

It is the further object of this invention to provide a solution that is compatible with all common widely deployed browsers and without requiring a change of browsers by users.

SUMMARY OF THE INVENTION

Embodiments of the present invention relate to systems and methods for protection against the operation of malware commonly used in identify-theft and cyber-fraud. In particular, but not by way of limitation, embodiments of the present invention relate to an apparatus, systems, and methods for preventing key logger malware that utilizes form grabbing techniques to steal financial and identity information from users' browsers. Embodiments of the present invention also relate to an apparatus, system, and method to prevent hook-based keyloggers from stealing information.

An embodiment of the present invention acts proactively to take actions that stop keylogging malware from stealing information without requiring detection of the keylogging malware itself.

An embodiment of the present invention protects against malicious key logging software and stops it from capturing passwords and other data.

An embodiment of a method includes detecting a browser form submission initiation call event associated with data inputs entered by a user. The form submission initiation call event may be an OnSubmit call event or a BeforeNavigate call event. Confidential data is cleared from the data inputs, thereby protecting against the threat of key logging malware capturing the confidential data. In one embodiment, the clearing of the confidential data is performed without requiring detection of the key logging malware. In one embodiment, the detecting of a browser form submission initiation call event occurs at a most privileged access level.

Embodiments of the present invention include implementations in personal computers (PCs), computing devices, and portable devices, such as PDAs, a handheld computer, a tablet computer, a laptop computer, or a notebook computer. In one embodiment, the detecting and the clearing are performed in a browser. In one embodiment, an anti-key logger performs the detecting and the clearing and the method further includes installing the anti-key logger at a most privileged access level for browser events in an API stack, thereby preventing a keylogger from having a superior level of access for the browser events. In one embodiment, an anti-key logger performs the detecting and the clearing and the method further includes protecting, by the anti-key logger, data inputs received at a physical driver level passing through to the operating system level.

BRIEF DESCRIPTION OF THE DRAWINGS

Herein below is a brief description of each of the drawings illustrating the various aspects and embodiments of the present invention, wherein:

FIG. 5 portrays examples of internet forms commonly used by consumers and targeted by form-grabbing key loggers in accordance with an embodiment.

DETAILED DESCRIPTION OF THE PREFERRED EMBODIMENTS PROTECTING AGAINST MALWARE UTILIZING KEYLOGGERS

Overview of Example AKL Implementation

Figure 1:
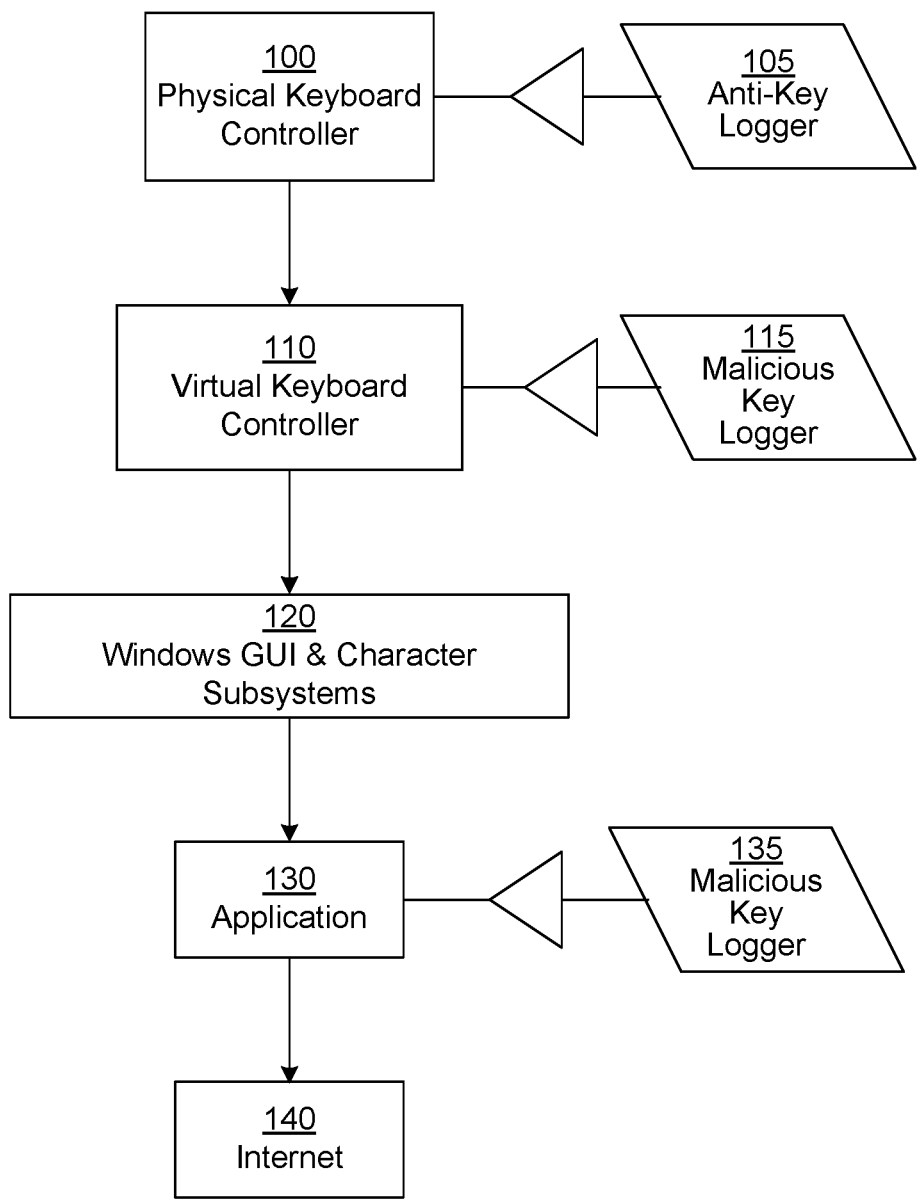
FIG. 1 is a diagram of the context of operation of embodiments of the present invention in accordance with an embodiment.

FIG. 1 is an overview of the environment in which embodiments of the invention operate, and the generalized location of other components in accordance with an embodiment of the present invention. At the keyboard driver level (100) input is provided by a user, the AKL (105) functions at this level to protect the inputted keyboard data. The virtual keyboard (110) may be the next step in the flow of inputted keyboard data, and is a common location for a key logger (115) to be present to intercept the inputted data. The operating system (120) receives the inputted keyboard data and passes the data to the application (130) being utilized by the user, which is a location where keyloggers (135) also intercept inputted keyboard data. Finally, the application passes the inputted keyboard data to the internet web server (140) per the user request.

In one embodiment, initially, software in accordance with the present invention installs itself at the most privileged access level (e.g., a zero-ring level) for all browser events within a stack. This ensures all instances of the web browser are protected. In one embodiment, the software in accordance with the present invention installs itself to the stack last, to ensure it is called first to prevent a keylogger from having a superior level of access. In one embodiment, the software in accordance with the present invention is placement aware and renegotiates its location in the API stack to ensure there are no other hooks that circumvent the protection at any time.

Form Grabbing Protection Examples

Figure 2:
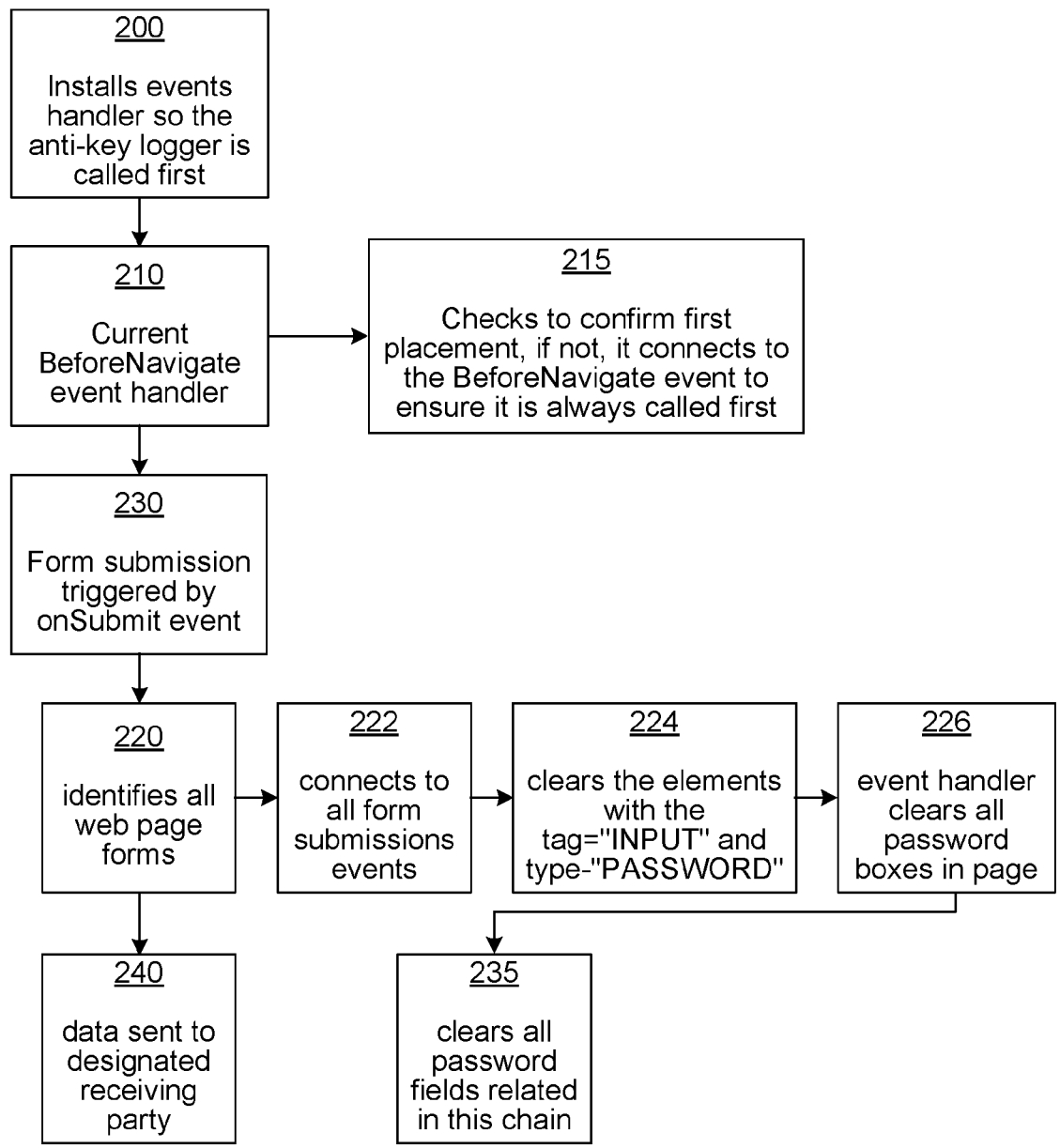
FIG. 2 is a diagram of actions in defeating the operation of form grabbing key loggers in accordance with an embodiment.

As illustrated in FIG. 2 software in accordance with an embodiment of the invention inserts itself in the API stack last, causing this software to be called first (S200). When a BeforeNavigate event is identified (S210), the software confirms its placement in the API stack (S215). When a form submission event occurs (S230), the software identifies all forms on the called web page (S220). If forms are present, the software connects to each form submission event (S222), the invention clears all form inputs marked with INPUT or PASSWORD (S224), and then the event handler clears all passwords (S226). The software provides the user inputted data to the OnSubmit event in due course to the designated receiving party, such as a bank (S240). The software also ensures all password forms fields are cleared from the API chain (S235) and thus are unavailable to capture by form grabbing key loggers.

This embodiment of the invention affects the current BeforeNavigate event handler or the equivalent event handler in other types of browsers. The software then identifies all forms on the web page and in each form then clears the elements with the tag="INPUT" and type="PASSWORD" (S224). The password in each form is cleared per event by the software (S226).

Figure 2A:
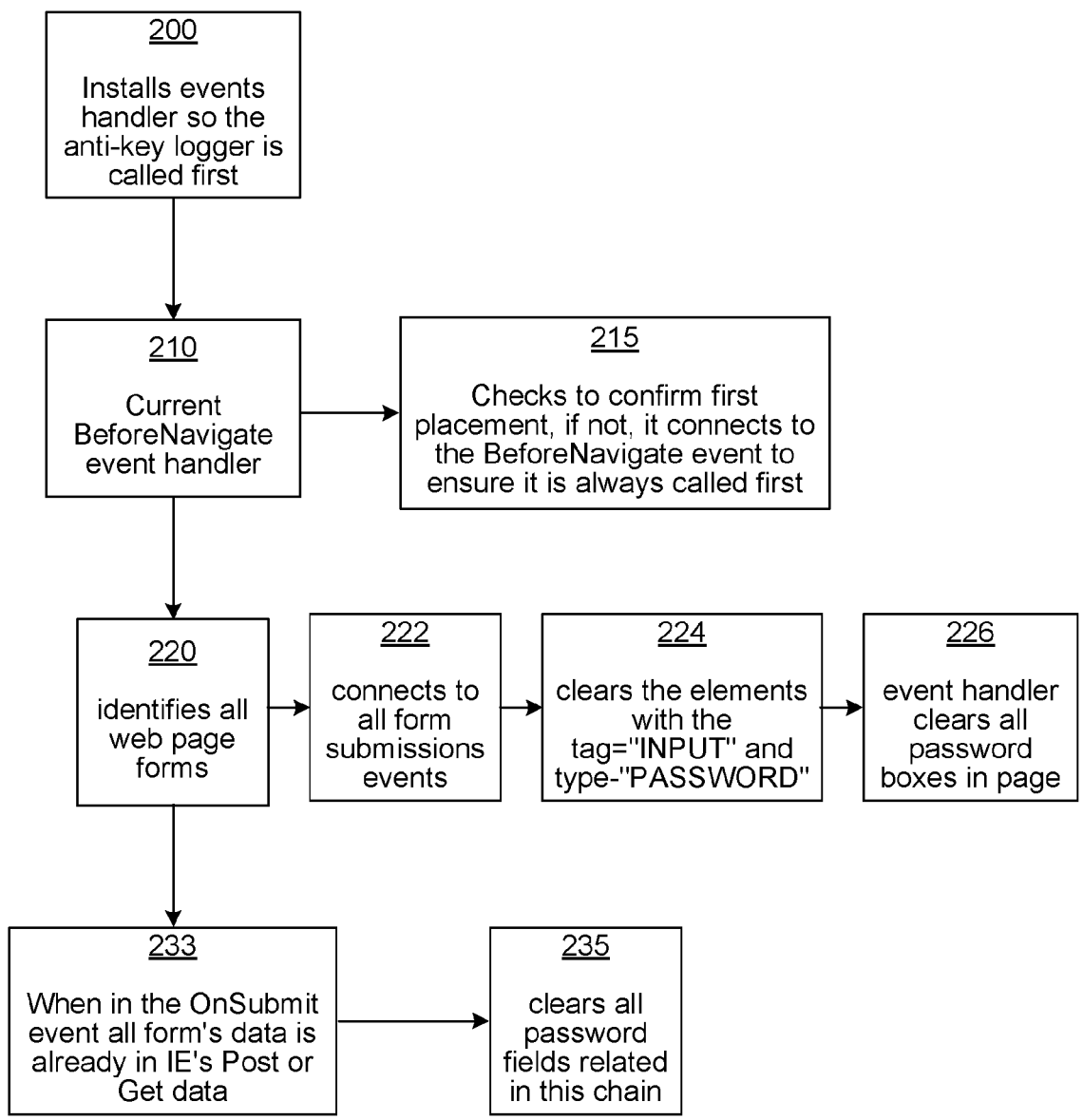
FIG. 2A is a variation of the diagram of FIG. 2, illustrating actions in defeating the operation of form grabbing key loggers in accordance with an embodiment

As illustrated in FIG. 2A, in one embodiment the software inserts itself in the API stack last, causing this software to be called first (200). When a BeforeNavigate event is identified (210), the software confirms its placement in the API stack (215). The software identifies all forms on the called web page (220). If forms are present, the software connects to each form submission event (222), the invention clears all form inputs marked with INPUT or PASSWORD (224), and then the event handler clears all passwords (226). The software provides the input through the OnSubmit event (233), and ensures all password forms fields are cleared (235).

In summary, the following are the steps in the operation of an embodiment of the present invention:

Set a hook at the most privileged access level in the API stack

Detect any form submission event

Allow form data submission

Clear form data

An embodiment of a method for blocking form-grabbing attacks comprises the following: Upon detection of a form submission event from the browser, and immediately after allowing the data to be properly submitted, the form input fields are cleared of data. The result of this method is to prevent form-grabbing key loggers from capturing form input data and thereby to protect the user from theft of passwords or credentials.

Windows Hook API Protection Mechanism Examples

There are two types of Windows Hooks: thread-specific hooks and system-wide hooks. A thread specific hook is associated only with a particular thread, including any thread owned by the calling process. To associate the anti-key logger hook with other processes and threads, the present invention employs a system-wide hook. Each hook is associated with a hook procedure. This procedure is always called when a particular event occurs. For example, when there is an event associated with the mouse, this hook procedure is called. In Windows®, the hook is set by calling the function SetWindowsHookEx( ). The hook is later removed by calling UnhookWindowsHookEx( ).

The invention protects itself at the most privileged access level by evoking SetWindowsHookEx(WH_KEYBOARD_LL, KeyboardProc, hInst, 0) thereby initiating and maintaining the low global level system hook. By monitoring this state we can thereby protect and identify any hook attempts from ring 3 Any attempts to intercept the hook are then rejected and passed down the API chain.

Typical hook-based key loggers catch each character as it is pressed, while a form grabber connects to browser events and in the BeforeNavigate event, when password fields are already filled, searches the password box on page and retrieves its text, including the full credential set.

Embodiments of the present invention provide a system and method for managing malware. In one embodiment, a form-grabbing key logger inserts a hook Dynamic Link Library file into the system-wide hook chain, and all key messages are intercepted by the Hook DLL unless it is kicked off the chain by another program or deprived of receiving messages by its top hook DLL. In a preferred embodiment, the present invention includes an Anti-Key Logger (AKL) software program in the form of a browser helper object and a DLL file. In this embodiment, these two files act in concert, the effect of which is to act to prevent the action of the form-grabbing key logger thereby protecting data as it passes through its normal browser API route. The present system acts under the assumption that the user computer may already be compromised and that an undetected key logger may be in place. An embodiment of the present invention detects attempts to place hooks, by techniques such as modification of import tables or the insertion of inline hooks.

Another embodiment of the invention, as an alternative to the DLL and browser extension combination, is to embody the embodiment in a browser's source code. Another embodiment of the invention, as an alternative to the DLL and browser extension combination, is to embody the embodiment in a browser's source code.

Figure 2B:
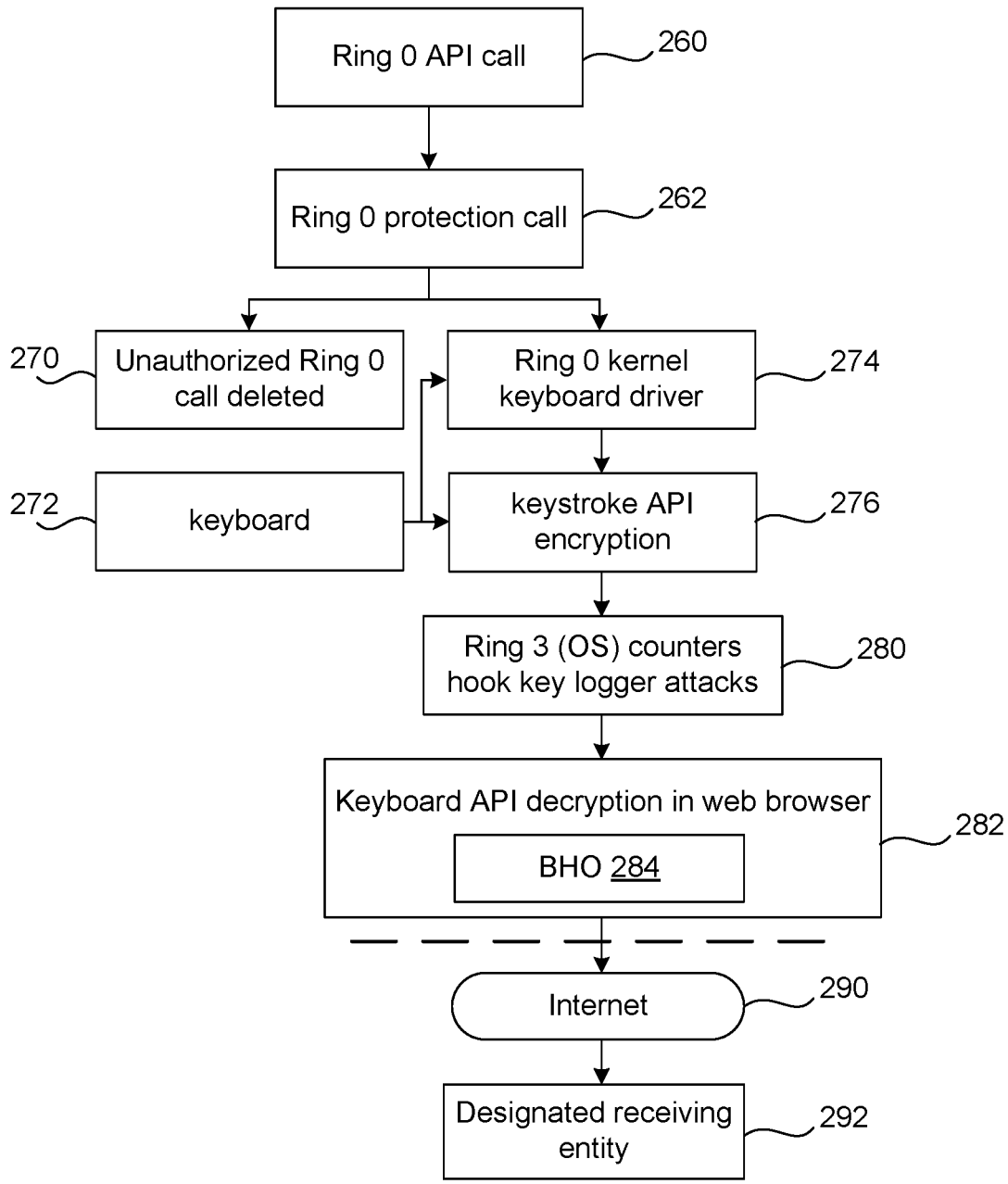
FIG. 2B is a diagram of actions in defeating the action of hook-based key loggers in accordance with an embodiment.

As illustrated in FIG. 2B, in one embodiment the initial hook placed by the present invention works within the 0-Ring level and the anti-form grabber code in the same instance (S260). Step S262 illustrates a 0-Ring protection call being placed. Step S270 illustrates that in one embodiment if an unauthorized 0-ring call is detected in 0-ring, then the unauthorized call is deleted. In one embodiment, the invention hooks its protection around the kernel keyboard driver (S274) where it intercepts keystroke interrupt requests and begins its encryption of the keystroke data (S276) received from the keyboard (S272). This data is then passed into the Ring 3 level, the Operating System (S280) then onto the intended application, typically a web browser (S282) whereby the keystrokes are decrypted by the Browser helper object (S284) or other browser plug-in and presented to the web form for submission as normal via the Internet (S290) to the designated receiving entity (S292). Accordingly, the present invention prevents the action of driver-based software key loggers as well as form grabbing key loggers.

Example of API Stack Order

Figure 3:
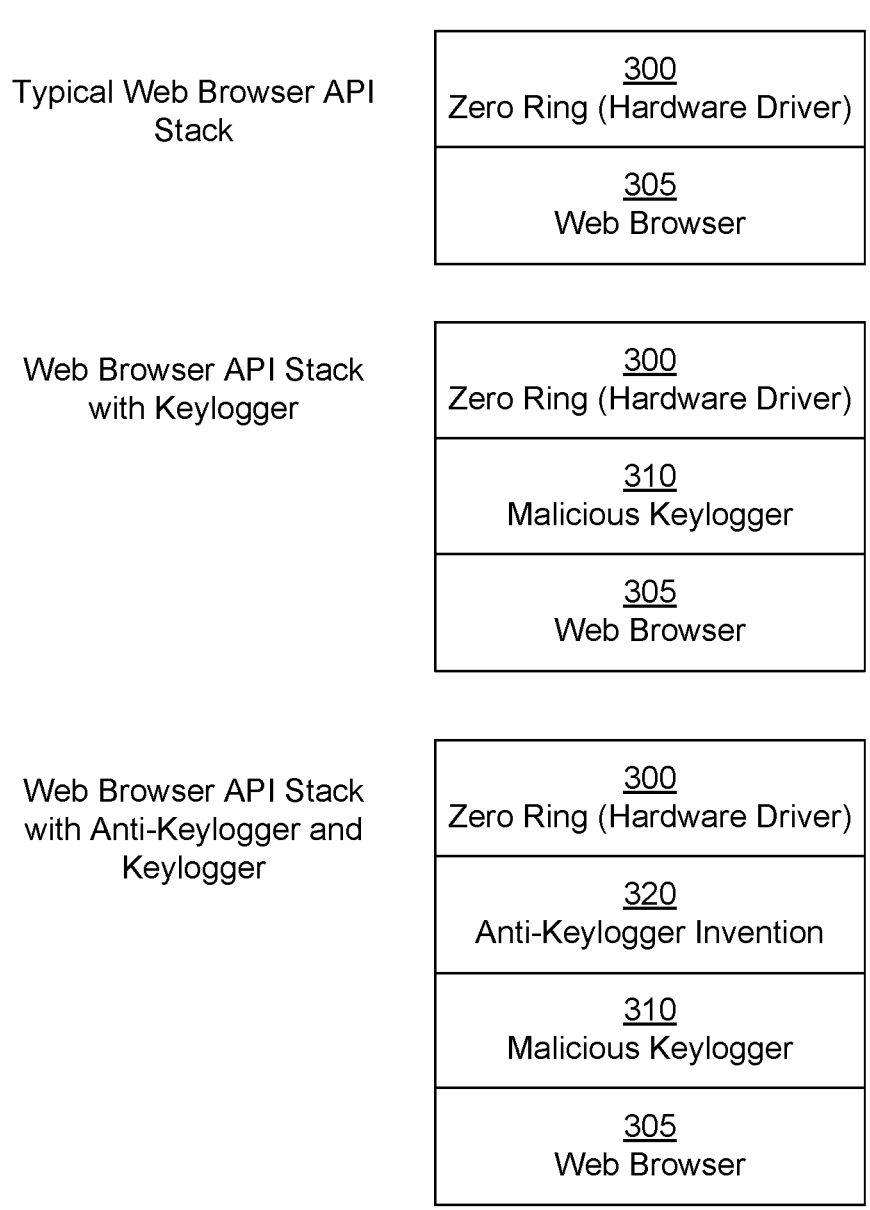
FIG. 3 shows block diagrams of the API stacks with and without keyloggers and with protection by the embodiments of the present invention in accordance with an embodiment.

Referring to FIG. 3, the first API stack, titled Typical Web Browser API Stack, highlights the hardware driver (300) interacting with the web browser (305) as two objects in the API stack. The second API stack, labeled Web Browser API Stack with Keylogger, shows both the hardware driver (300) and the web browser (305, with the keylogger (310) running between both objects in the API stack intercepting all keyboard input destined for the browser. The third API stack represents all the previous objects in the API stack, hardware driver (300), keylogger (310), and web browser (305). Included in stack, in proper order, is the inclusion of the software which counters any keylogger in the stack.

Distribution by Financial Institution Examples and Malware Detection

Figure 4:
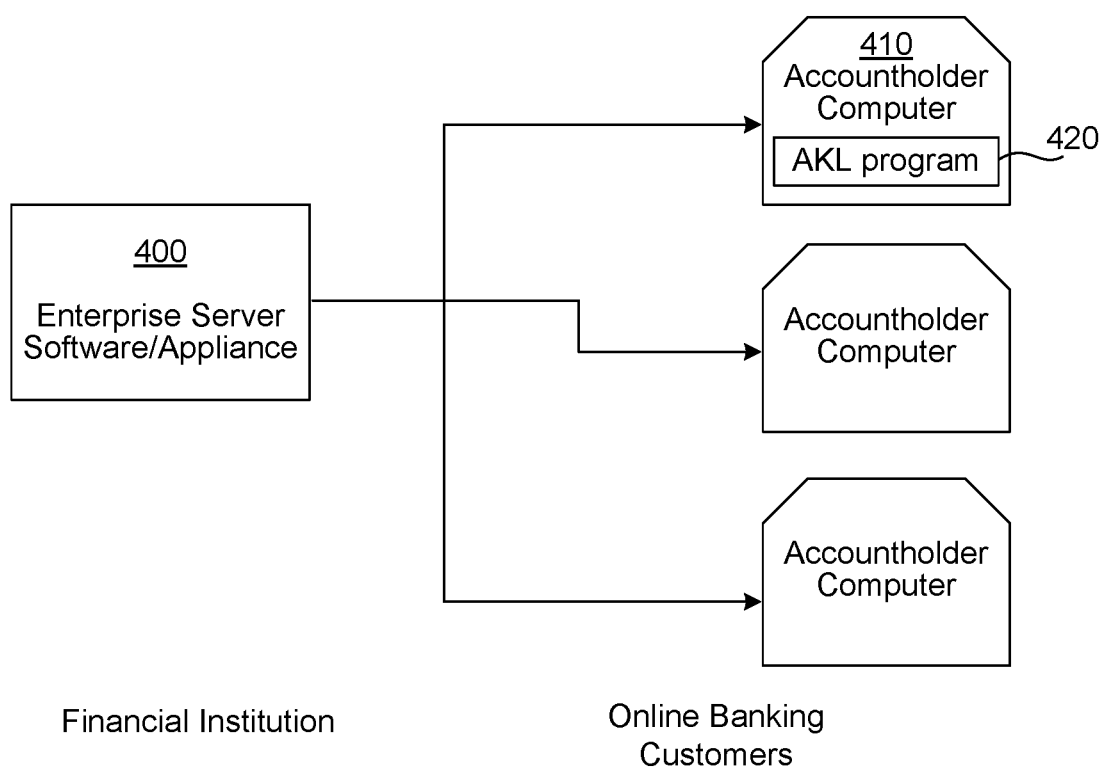
FIG. 4 portrays the configuration of a system wherein servers at a financial institution communicate with multiple accountholder PCs for the distribution, update and authentication of software incorporating AKL functionality and other processes in accordance with an embodiment.

Referring to FIG. 4, an embodiment of the invention, the software containing anti-key logger functionality (420) is distributed by a financial institution (400) to thousands or millions of its customers which have online access to their accounts through browsers based on individual PCs or other computing devices (410).

In another embodiment of the invention, software containing anti-key logger functionality can be distributed by a financial institution to thousands or millions of its customers which have online access to their accounts. This software is downloaded to each individual accountholder PC upon initiation of an online access session with the financial institution. The anti-key logger software operating on each individual PC incorporates processes enabling it to communicate with a master server appliance or hierarchy of server appliances within the financial institution in order to allow tracking of accountholder PCs that have downloaded and installed this software. After installation, upon initiation of each subsequent online access session with the financial institution the software verifies its presence on the PC and identifies itself. In the case of an accountholder that initiates an online access session (account login) from a PC which does not have the AKL installed, the financial institution can choose to deny access or require a higher level of authentication. In addition, the financial institution may recommend to the user that his or her password be changed based on the greater exposure to theft of credentials during use of a browser running on a PC that is not protected by the AKL.

Another aspect of the embodiment that uses AKL functions distributed to multiple online accountholders from a central server is the addition of blacklist, whitelist, or both blacklists and whitelists to the AKL functions. Such signature lists can include known Phishing sites which target the financial institution's accountholders or, in the case of white lists, can include newly launched sites which are used to deliver services to the institution's customers. By focusing on blacklists of sites that target the host financial institution, as opposed to incorporating broad-based blacklists, the signature list updates can be provided in small size files which do not cause noticeable waits or otherwise degrade system performance. The addition of such lists complements the effectiveness of the AKL in preventing the ability for malware to comprise the credentials of an online user. Moreover, the server to PC communications processes, which verify the presence and identity of software in accordance with the present invention upon the initiation of each new online session, can be used as an occasion to update such signature lists. This creates the opportunity to update signature lists in a more timely fashion. A timelier updating of newly identified malicious sites is a significant benefit given that the window of operation for many Phishing sites is five to twenty four hours which is shorter than the update cycle of most commercial anti-virus and anti-spyware products.

In one embodiment, the software program further comprises a module for detecting malicious behaviors of a known malware, and a module for removing the malware.

Examples of Forms Targeted by Form Grabbing Keyloggers

FIG. 5 is an example of a typical form used with a browser. Sensitive customer credentials and information are submitted through such forms to web sites of financial institutions in order to gain access to customer accounts. Such forms are also used to verify the identity of a customer and convey credit card or other payment data during an online purchase. Similar forms are used to gain access to web sites that may not involve financial accounts but which may contain confidential information including personally identifiable information, government records, health records, or other information that is private, proprietary or commercially sensitive.

Kernel Level Protection Mechanism Example

Figure 6:
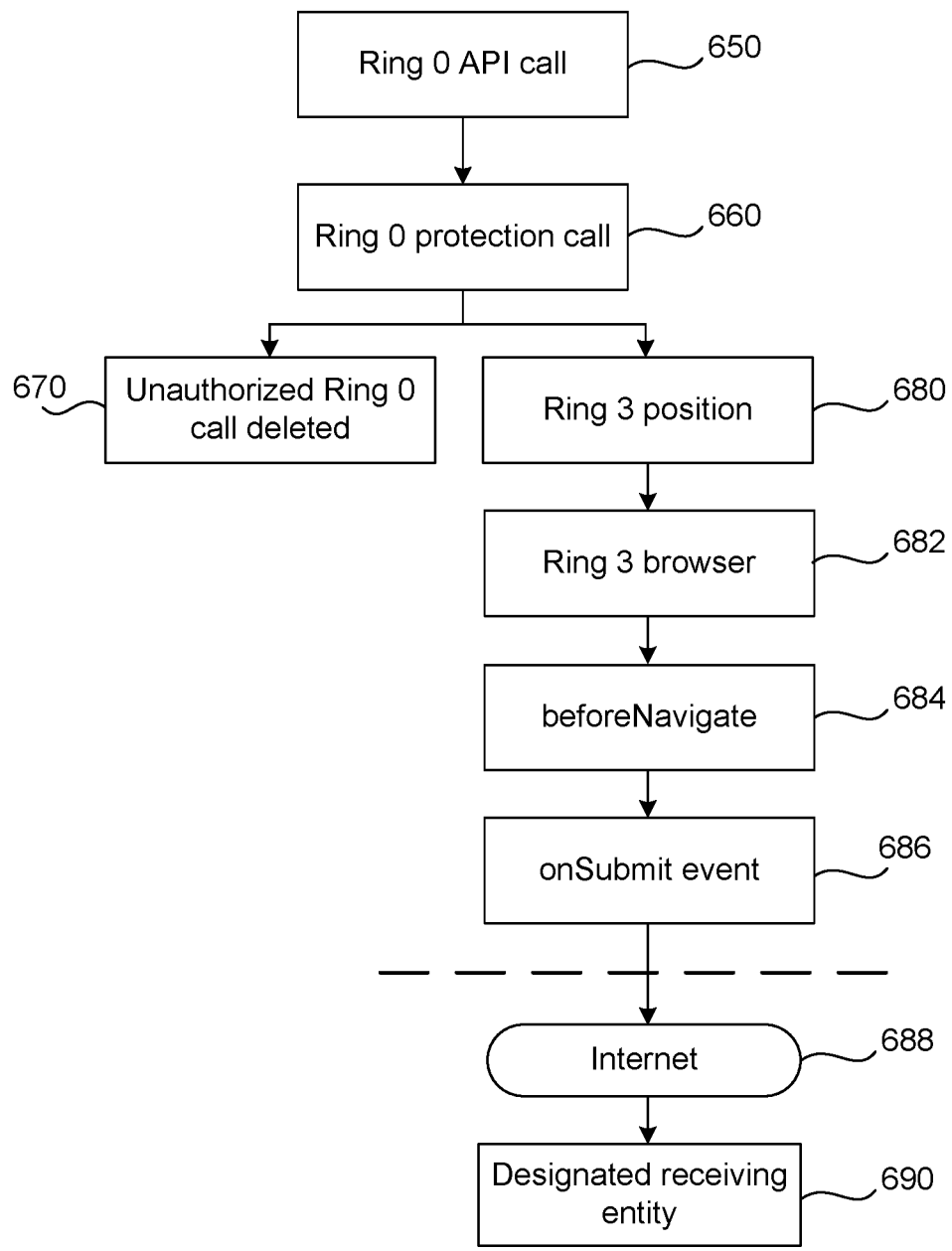
FIG. 6 is a diagram that illustrates the manner in which the invention functions to maintain its position in an API stack in accordance with an embodiment.

FIG. 6 illustrates the manner in which an embodiment of the invention functions to maintain its position in the API stack by illustration of its relation to kernel levelcalls. Ring 0 is the level with the most privileges and interacts most directly with the physical hardware such as the CPU and memory (650). This is also known as the kernel level. Under an embodiment of the present invention, protection is inserted at this level (660) whereby the protection can determine if an unauthorized kernel level call is being made (670) at which time it is bounced from the API chain. If no attempt is detected the calls are passed to Ring 3 (Software level) (680) at which time calls are passed to the browser (682). The browser handles requests including POST/GET commands and credentials are passed to the beforeNavigate event (684) then on to the onSubmit event (686) whereby user credentials are sent over the internet (688) to the intended receiving entity (690).

Toolbar Interface Example

Another embodiment includes a toolbar interface that allows the user to be aware of its operation. The use of such toolbars is well known in the art as these programs are commonly used to provide awareness of the operation of security monitoring functions. When a method according to the invention is incorporated into a software program containing blacklist-driven, heuristic-based, or other anti-phishing functionality, the users will be provided with graphic alerts when the browser is directed to web sites which are considered to be risky.

Automatic Installation/De-Installation Examples

In one embodiment, the module for inserting and executing the predetermined software processes is dynamically installed in a computer, a mobile communication device or a mobile internet device which is different from the computer, the mobile communication device or the mobile internet device the user keyed in the data for the first time, and automatically uninstalled there from the module after the user logs off the different computer, mobile communication device or mobile internet device. In one embodiment, if a registered user tries to install the present invention from a different computer, the present invention will uninstall itself after operation in the different computer. The present invention may also be implemented be a part of an enterprise implementation with a master server.

Examples of Threat Protection

The invention protects against at least the following threats:

Window title enumeration using FindWindow( )
BHO or Firefox Browser Extension hooks
LSP (Layered Service Provider)
DDE (Dynamic Data Exchange) using WWW_GetWindowinfo topic
OLE (Object Linking and Embedding) using IWebBrowser2
API Hooking (e.g. Wininet HttpSendRequest)
Windows Hooking (e.g. SetWindowsHookEx,WH_GETMESSAGE/WH_KEYBOARD)
Form grabber key loggers
Browser location (current URL) gatherers Additional Browser and Software Examples While the foregoing description utilizes Internet Explorer® as an example, the invention is not limited to this browser but can be utilized with any internet browser, including but not limited to Firefox®, Safari® or Opera®. In one embodiment, the software modules or processes of the present invention can all be called in a single file object. In one embodiment, the present invention can be integrated into the browser itself. Alternatively, the present invention can be invoked/downloaded by an individual web page or website.

The software modules or processes of the present invention can all be called in a single file object. The present invention can be integrated into the browser itself. Alternatively, the present invention can be invoked/downloaded by an individual web page or website.

The present invention can be applied to existing or evolving software operating systems and development tools such as Javascript, Ajax, Flash and RIA, for cross platform use or mobile applications. Each platform has a different operating system therefore has different call structures and API methods. The invention can be applied to different OS's by manipulating different calls as they apply to the different OS and those related calls.

In an alternative embodiment, software embodying the invention can be packaged as a standalone component to allow the product to be delivered to the client in a manner requiring minimal interaction. For example, one embodiment would utilize the component object model (COM) developed by Microsoft for Windows platforms. Software based on ActiveX technology is prevalent in the form of Internet Explorer plug-ins and, more commonly, in ActiveX controls.

In yet another embodiment of the invention, a portable device contains an installable embodiment of the invention. In this form, the invention can be used by an accountholder of a financial institution when accessing his or her account via a browser on a public use or other PC that is not known to be protected by the invention. Examples of such PCs might be those available in airports, internet cafes, or hotel business centers.

A software program according to one embodiment of the invention is embedded in a microprocessor-readable storage medium and executable by a microprocessor to prevent software key logging. The software program comprises a module for inserting and executing predetermined software processes at the most privileged access level in an application programming interface ("API") stack of a browser. The software processes includes a process of detecting a browser form submission initiation event at the most privileged access level; a process of intercepting data inputs keyed in by a user at the most privileged access level; and a process of (1) submitting the keyed-in data to a designated entity through the API stack while (2) clearing confidential data from intercepted data at the most privileged access level prior to a subsequent transmission, which does not contain the confidential data, in response to the software key logging through the API stack to an internet communication port.

The browser may be Internet Explorer, and the form submission initiation call event takes a form of an onSubmit call or a BeforeNavigate call under Internet Explorer.

The predetermined software processes may be integrated into a single browser-called code object. The predetermined software processes may be contained in a form of a non-executable file. The predetermined software processes may be integrated into the browser, and the browser may be Internet Explorer or other browser.

The module may be embodied in an ActiveX object to operate within the Windows operating system, or embodied in a browser extension file to operate within the Mozilla Firefox browser. Alternatively, the module is embodied in a platform-independent object-oriented programming language used for writing applets downloaded from internet, and the cross platform programming language is Java.

The module may be initiated and called by a web site or a web page, or the module is called locally in conjunction with a specific web site or a web page. Alternatively, the module is downloaded in response to a web page after determining that the module is not present therein.

The foregoing description portrays various embodiments of the present invention along with examples of how the present invention may be implemented. These examples and embodiments should not be considered the only possible embodiments or implementations of the present invention. Further embodiments of present invention may involve the operation of a portable or wireless device, including implementation of the invention or portions of the invention in software operating on such a device, or firmware embedded in such a device or transmitted to the device from a remote system.

Apparatus, Hardware, Firmware, System and Computer Readable Medium Examples

Portions of the present invention may be applied to general purpose or a specialized digital device, computer system, server, computer or microprocessor programmed according to the teachings of the present disclosure, as will be apparent to those skilled in the art of communication, computer and e-commerce. The microprocessor can be embedded in a computer, a computing device, a portable device, a mobile communication device or a mobile internet device. The mobile communication device may be a cellular phone, a radio phone, a satellite phone, or a smartphone. The mobile internet device may be a PDA, a handheld computer, a tablet computer, a laptop computer, or a notebook computer.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is embedded in a storage/recording medium (media) having instructions stored thereon/in which can be used to control, or cause, a microprocessor or a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards, USP drivers), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Ultimately, such computer readable media further includes software for performing the present invention, as described above. Included in the programming (software) of the general/specialized computer or microprocessor are software modules for implementing the teachings of the present invention.

| DEFINITION OF SELECTED TERMS | |
|---|---|
| AKL | Anti-key logger |
| API Stack | Application Program Interface Stack |
| BHO | Browser Helper Object |
| DLL | Dynamic Link Library |
| DDE | Dynamic Data Exchange |
| Form | A user input area of a webpage |
| Hook | A function inserted into an API stack |
| IRQ | Interrupt Request |
| Malefactors | Persons designing and implementing malware |

Other Examples

Embodiments of the present invention include software, systems and methodology for protecting against malware key logger attacks that utilize, for example, form-grabbing techniques. The browser is protected from key logging malware attacks and the loss of critical user confidential information often entered into internet forms for the purpose of buying items or logging into financial institutions. An embodiment of a method for blocking form-grabbing attacks including the following steps. Upon detecting a form submission event from the browser, and immediately after allowing the data to be properly submitted, the form input fields are cleared of data. The method prevents hook-based key loggers or form-grabbing key loggers from capturing form input data, thereby protecting the user from theft of passwords or credentials.

In one embodiment, the process of intercepting also encrypts the data inputs keyed in by the user at the kernel level, and the module further includes a process of passing the encrypted data to a 3-ring level, and a process of decrypting data which passed via the 3-ring level.

A software program according to another embodiment of the invention is embedded in a microprocessor-readable storage medium and executable by a microprocessor to prevent software key logging. The software program comprises: a module for inserting and executing predetermined software processes at the most privileged access level in an application programming interface ("API") stack of a browser. The software processes includes: a process of inserting an initial hook which works within the kernel level and prevents any other hooks from inserting at a superior level of access; a process of detecting a browser form submission initiation call event at the most privileged access level; a process of intercepting and encrypting data inputs keyed in by a user at the kernel level; a process of passing the encrypted data to a 3-ring level where a hook is inserted by a hook-based key logger; a process of decrypting data passed to the 3-ring level; and a process of submitting the decrypted data to a designated entity through the API stack to an internet communication port.

A method for preventing software key logging executable by a microprocessor according to yet another embodiment of the invention, comprises: a step of inserting and executing by the microprocessor a pre-determined software process at the most privileged access level in an application programming interface ("API") stack of a browser. The software processes includes: a process of detecting a browser form submission initiation event at the most privileged access level; a process of intercepting data inputs keyed in by a user at the most privileged access level; and a process of (1) submitting the keyed-in data to a designated entity through the API stack while (2) clearing confidential data from intercepted data immediately after allowing the data to be properly submitted, in response to the software key logging through the API stack to an internet communication port.

In conclusion, the present invention provides, among other things, a system and method for protecting against form-grabbing and other key loggers. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the embodiments.

Although the present invention has been fully described in connection with the preferred embodiment thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A method for preventing software key logging executable by a microprocessor, comprising:
   installing and maintaining an anti-key lodger at a most privileged access level for browser events in an Application Programming Interface (API) stack;
   detecting, by the anti-key logger, a browser form submission initiation call event associated with data inputs entered by a user, wherein the form submission initiation call event is an OnSubmit call event or a BeforeNavigate call event;
   submitting the data inputs to a designated entity; and
   clearing, by the anti-key logger, confidential data from the data inputs to protect against the threat of key logging malware capturing the confidential data.

2. The method of claim 1, wherein the clearing of the confidential data is performed without requiring detection of the key logging malware.

3. The method of claim 1, wherein the anti-key logger is installed to ensure that the anti-key logger is called first to prevent the key logging malware from operating at a more privileged access level.

4. The method of claim 1, wherein the microprocessor is disposed within a computer, a mobile communication device, a smartphone, or a mobile Internet device.

5. The method of claim 4, wherein the mobile Internet device is one of a personal digital assistant (PDA), a handheld computer, a tablet computer, a laptop computer, or a notebook computer.

6. The method of claim 1, wherein the detecting and the clearing are performed in the browser.

7. The method of claim 1, wherein the clearing of confidential data comprises identifying form input fields on a web page and clearing the confidential data after allowing the confidential data to be submitted to the designated entity to prevent capture of the confidential data by the key logging malware.

8. The method of claim 1, wherein the anti-key logger is placement aware and performs at least one check to confirm that the anti-key logger is called first.

9. The method of claim 1, wherein the method further comprises: protecting, by the anti-key logger, the data inputs received at a physical driver level passing through a virtual keyboard level and an operating system level.

10. The method of claim 1, wherein the data inputs are keyed in by the user.

11. A computer program product to prevent software key logging including computer program code embedded in a non-transitory microprocessor-readable storage medium executable by a microprocessor, which when executed on the microprocessor, implements a method, comprising:
   installing and maintaining an anti-key logger at a most privileged access level for browser events in an Application Programming Interface (API) stack;
   detecting, by the anti-key logger, a browser form submission initiation call event associated with data inputs entered by a user, wherein the form submission initiation call event is an OnSubmit call event or a BeforeNavigate call event;
   submitting the data inputs to a designated entity; and
   clearing, by the anti-key logger, confidential data from the data inputs, thereby protecting against the threat of key logging malware capturing the confidential data.

12. The computer program product of claim 11, wherein said clearing of the confidential data is performed without requiring detection of the key logging malware.

13. The computer program product of claim 11, wherein the anti-key logger is installed to ensure that the anti-key logger is called first to prevent the key logging malware from operating at a more privileged access level.

14. The computer program product of claim 11, wherein the microprocessor is disposed within a computer, a mobile communication device, a smartphone, or a mobile Internet device.

15. The computer program product of claim 14, wherein the mobile Internet device is one of a personal digital assistant (PDA), a handheld computer, a tablet computer, a laptop computer, or a notebook computer.

16. The computer program product of claim 11, wherein the detecting and the clearing are performed in the browser.

17. The computer program product of claim 11, further comprising inserting software processes for performing the detecting and clearing at the most privileged access level in the API stack of the browser.

18. The computer program product of claim 11, wherein the clearing of confidential data comprises identifying form input fields on a web page and clearing at least some form input fields of the confidential data after allowing the data to be submitted to the designated entity to prevent capture of the confidential data by the key logging malware.

19. The computer program product of claim 11, wherein the data inputs are keyed in by the user.

20. The computer program product of claim 11, wherein the anti-key logger is placement aware and performs at least one check to confirm that the anti-key logger is called first.

21. The computer program product of claim 11, further comprising: protecting, by the anti-key logger, the data inputs received at a physical driver level passing through a virtual keyboard level and an operating system level.

22. A method for preventing software key logging executable by a microprocessor, comprising:
   installing and maintaining an anti-key logger at a most privileged access level for browser events in an Application Programming Interface (API) stack;
   detecting, by the anti-key logger, a browser form submission initiation call event associated with data inputs entered by a user in a user input area of a web page, wherein the form submission initiation call event is an OnSubmit call event or a BeforeNavigate call event;
   submitting the data inputs to a designated entity;
   identifying form input fields on the web page having confidential data;
   clearing, by the anti-key logger, the confidential data to prevent capture of the confidential data by key logging malware; and
   wherein the clearing of the confidential data is performed regardless of whether or not key logging malware is present.

23. The method of claim 22, wherein the anti-key logger is installed to ensure that the anti-key logger is called first to prevent the key logging malware from operating at a more privileged access level.

24. The method of claim 22, further comprising protecting, by the anti-key logger, the data inputs received at a physical driver level passing through a virtual keyboard level and an operating system level.

25. The method of claim 22, wherein the anti-key logger is placement aware and performs at least one check to confirm that the anti-key logger is called first.

26. A computer program product to prevent software key logging including computer program code embedded in a non-transitory microprocessor-readable storage medium executable by a microprocessor, which when executed on the microprocessor, implements a method, comprising:

installing and maintaining an anti-key logger at a most privileged access level for browser events in an Application Programming Interface (API) stack;

detecting, by the anti-key logger, a browser form submission initiation call event associated with data inputs entered by a user in a user input area of a web page, wherein the form submission initiation call event is an OnSubmit call event or a BeforeNavigate call event;

submitting the data inputs to a designated entity;

identifying form input fields on the web page having confidential data;

clearing, by the anti-key logger, the confidential data to prevent capture of the confidential data by key logging malware; and wherein the clearing of the confidential data is performed regardless of whether or not key logging malware is present.

27. The computer program product of claim 26, wherein the anti-key logger is installed to ensure that the anti-key logger is called first to prevent the key logging malware from operating at a more privileged access level.

28. The computer program product of claim 26, further comprising protecting, by the anti-key logger, the data inputs received at a physical driver level passing through a virtual keyboard level and an operating system level.

29. The computer program product of claim 26 wherein the anti-key logger is placement aware and performs at least one check to confirm that the anti-key logger is called first.

* * * * *

UNITED STATES PATENT AND TRADEMARK OFFICE
CERTIFICATE OF CORRECTION

PATENT NO. : 9,503,473 B1
APPLICATION NO. : 15/207279
DATED : November 22, 2016
INVENTOR(S) : Raymond Lloyd Reddington It is certified that error appears in the above-identified patent and that said Letters Patent is hereby corrected as shown below:

In the Claims

Column 13, Line 4 of Claim 1 change "lodger" to --logger--.

Signed and Sealed this
Second Day of May, 2017

Michelle K. Lee
*Director of the United States Patent and Trademark Office*